United States Patent
Wurtenberger et al.

(10) Patent No.: US 9,521,580 B1
(45) Date of Patent: Dec. 13, 2016

(54) REDUCTION OF INTERFERENCE POTENTIAL BETWEEN A CELL TOWER AND AN ELECTROMAGNETIC RADIATION SOURCE

(71) Applicant: Sprint Communications Company L.P., Ovelrand Park, KS (US)

(72) Inventors: Andrew M. Wurtenberger, Olathe, KS (US); Sreekar Marupaduga, Overland Park, KS (US); Chaitanya Chukka, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/640,708

(22) Filed: Mar. 6, 2015

(51) Int. Cl.
*H04B 1/00* (2006.01)
*H04W 28/04* (2009.01)
*H04W 72/04* (2009.01)
*H04W 72/08* (2009.01)

(52) U.S. Cl.
CPC ....... *H04W 28/048* (2013.01); *H04W 72/0446* (2013.01); *H04W 72/082* (2013.01)

(58) Field of Classification Search
USPC .......................................... 455/63.2
See application file for complete search history.

(56) References Cited

U.S. PATENT DOCUMENTS

| | | | |
|---|---|---|---|
| 9,100,906 B1* | 8/2015 | Gauba | H04W 48/20 |
| 2006/0240782 A1* | 10/2006 | Pollman et al. | H04B 17/345 |
| | | | 455/67.11 |
| 2014/0146728 A1* | 5/2014 | Cha et al. | H04W 52/0206 |
| | | | 370/311 |

\* cited by examiner

*Primary Examiner* — Wesley Kim
*Assistant Examiner* — Raj Chakraborty

(57) ABSTRACT

Methods and systems are provided for reducing the potential of interference between a cell tower and a neighboring EMR source. At a base station, such as an eNodeB, it is determined that a sector of the cell tower has the potential for interference with the EMR source based on, for instance, monitoring of network parameters, a computation of the sector's azimuth, and a distance between the sector and the EMR source. Time intervals are computed corresponding to when the EMR source emits EMR in a direction of the sector of the base station, Uplink and downlink transmissions to and from the sector of the cell tower are ceased during the computed time intervals.

17 Claims, 5 Drawing Sheets

REDUCTION OF INTERFERENCE POTENTIAL BETWEEN A CELL TOWER AND AN ELECTROMAGNETIC RADIATION SOURCE

SUMMARY

A high level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this disclosure describes, among other things, systems and methods for reducing the potential for interference between transmissions of a cell tower and electromagnetic radiation (EMR) emitted by an EMR source. Eliminating the potential of interference involves monitoring various signal values, then determining which sector has a computed azimuth that bears toward an EMR source. If a distance between that sector and the EMR source is less than a predetermined threshold, the base station may cause uplink and downlink transmissions to and from that sector to be ceased during a short period of time in which the EMR source is directed toward the sector. The base station has the capability to compute further time periods when the EMR source may be directed toward the sector based on a cyclic and predictable nature of the EMR source.

BRIEF DESCRIPTION OF THE DRAWINGS

Illustrative embodiments of the present invention are described in detail below with reference to the attached drawing figures, and wherein.

DETAILED DESCRIPTION

Figure 1:
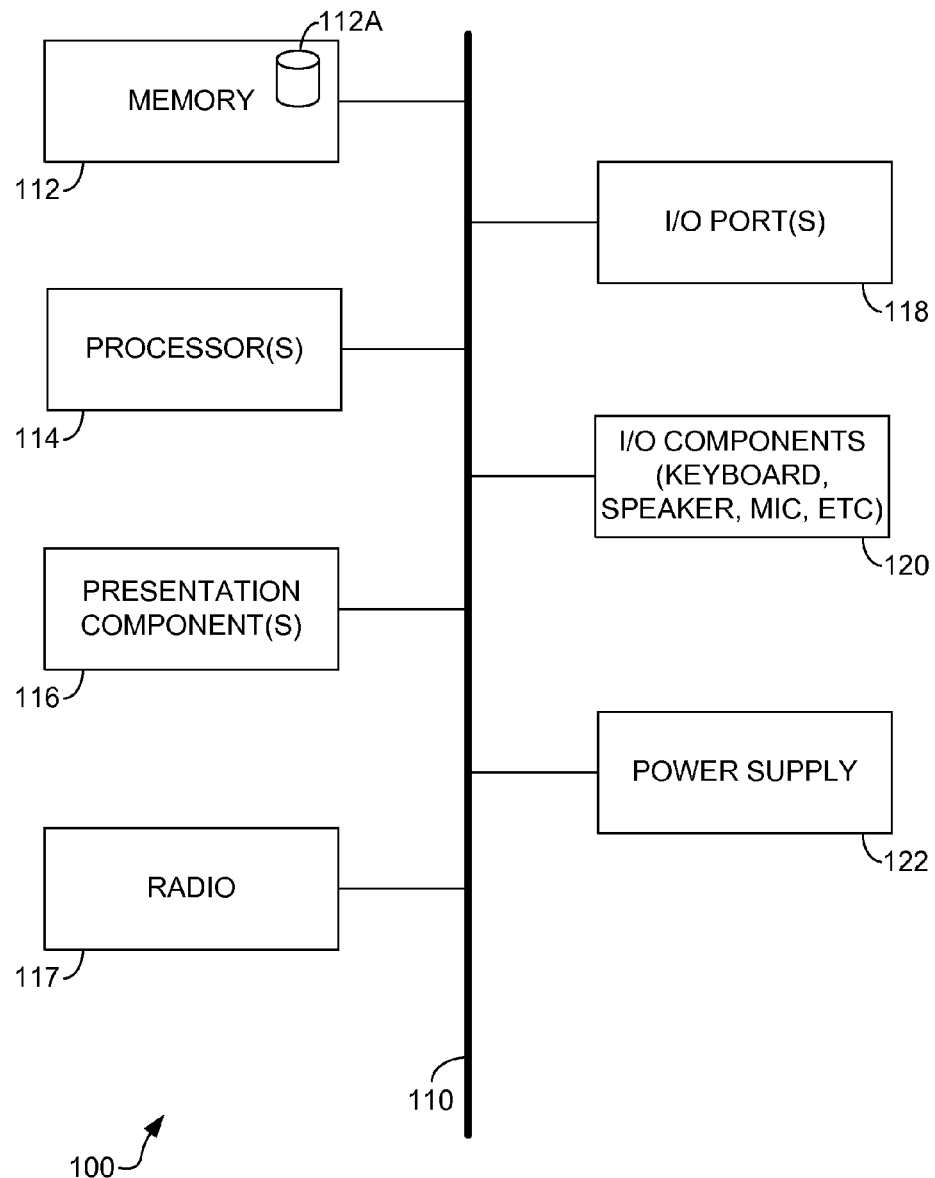
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BS Base Station
BSC Base Station Controller
BTS Base Transceiver Station
CDMA Code Division Multiple Access
EMR Electromagnetic Radiation
eNodeB Evolved Node B
GPRS General Packet Radio Service
GSM Global System for Mobile Communications
LTE Long-Term Evolution
RF Radio-Frequency
RRU Remote Radio Unit
RSRP Reference Signal Received Power
SNR Signal-to-Noise Ratio
WCDMA Wideband Code Division Multiple Access Further, various technical terms are used throughout this description. An illustrative resource that fleshes out various aspects of these terms can be found in Newton's Telecom Dictionary, 28th Edition (2014).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Embodiments of the present invention are directed toward reducing the potential of interference between a cell tower and an adjacent EMR source. The base station corresponding to the cell tower may first determine that there is a neighboring EMR source that has the potential to interfere, which may by done by monitoring various network parameters, including noise flow, signal strength, SNR values, RSRP values, etc. The base station then may determine which sector of the cell tower has an azimuth that is bearing toward the EMR source. Based on this, the base station may determine that an action will be taken if the distance between the sector bearing toward the EMR source and the EMR source is less than a predetermined threshold. The action taken may include transmissions to and from that sector being terminated for a short duration of time while the EMR source is emitting EMR in a direction of the sector. The base station has the capability to determine various periods of time in which the EMR source is predicted to be emitting EMR in the direction of the sector, such as for EMR sources whose EMR emissions are predictable, including those that rotate or that are at least cyclic.

Stopping transmissions to and from the sector for a very short period of time delays packet transmissions to a user, but the delay is so small that it is unnoticeable to the user. Typically, this scenario provides a better user experience than not stopping transmissions and risking interference, which would be noticeable to users. The block error rate, or BLER may also be improved. Importantly, while deployment of a base station or cell tower using other methods to reduce the potential of interference, including the use of filters, can take weeks or even months, aspects described herein allow for a much shorter lead time for deployment of the cell tower. Additionally, there is no equipment to maintain, as there is when filters are utilized. For many of these reasons, the cost savings are significant.

Accordingly, in a first aspect, a computerized method carried out by at least one server having one or more processors for reducing an interference potential between a cell tower and an electromagnetic radiation (EMR) source is provided. The method comprises, at a base station corresponding to the cell tower, determining that a sector of the cell tower has a potential for interference with the EMR source, computing a plurality of time intervals when the EMR source emits EMR in a direction of the sector of the cell tower, and ceasing uplink and downlink transmissions to and from the sector of the cell tower during the computed plurality of time intervals.

In a second aspect, a system is provided for reducing an interference potential between a cell tower and an EMR source. The system comprises a processor and one or more computer-readable media storing computer-useable instructions that, when used by the processor, cause the processor to compute an azimuth of a sector of the cell tower, and based on the azimuth of the sector and a distance between the sector and the EMR source, determine that transmissions to and from the sector have a potential to interfere with radiation emitted from the EMR source. Further, the processor is caused to determine a plurality of time periods at which the EMR source will be directed toward the sector, each of the plurality of time periods having a first time and a second time. At each of the first times, the processor is caused to cease uplink and downlink transmissions to and from the sector, and at each of the second times, resume the uplink and the downlink transmissions to and from the sector.

In a third aspect, one or more computer-storage media having computer-executable instructions embodied thereon are provided that, when executed, perform a method for reducing an interference potential between a cell tower and an EMR source. The method comprises determining that EMR emitted from the EMR source has a potential to interfere with transmissions to and from a sector of the cell tower, the potential interference determined based on an azimuth of the sector and a distance between the sector and the EMR source. Further, the method comprises computing a first period of time starting at a first time and ending at a second time when the EMR source is predicted to emit the EMR in a direction of the sector of the cell tower, and at the first time, ceasing uplink and downlink transmissions to and from the sector of the cell tower. The method also comprises at the second time, resuming the uplink and downlink transmissions to and from the sector of the cell tower.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117, input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

Figure 2:
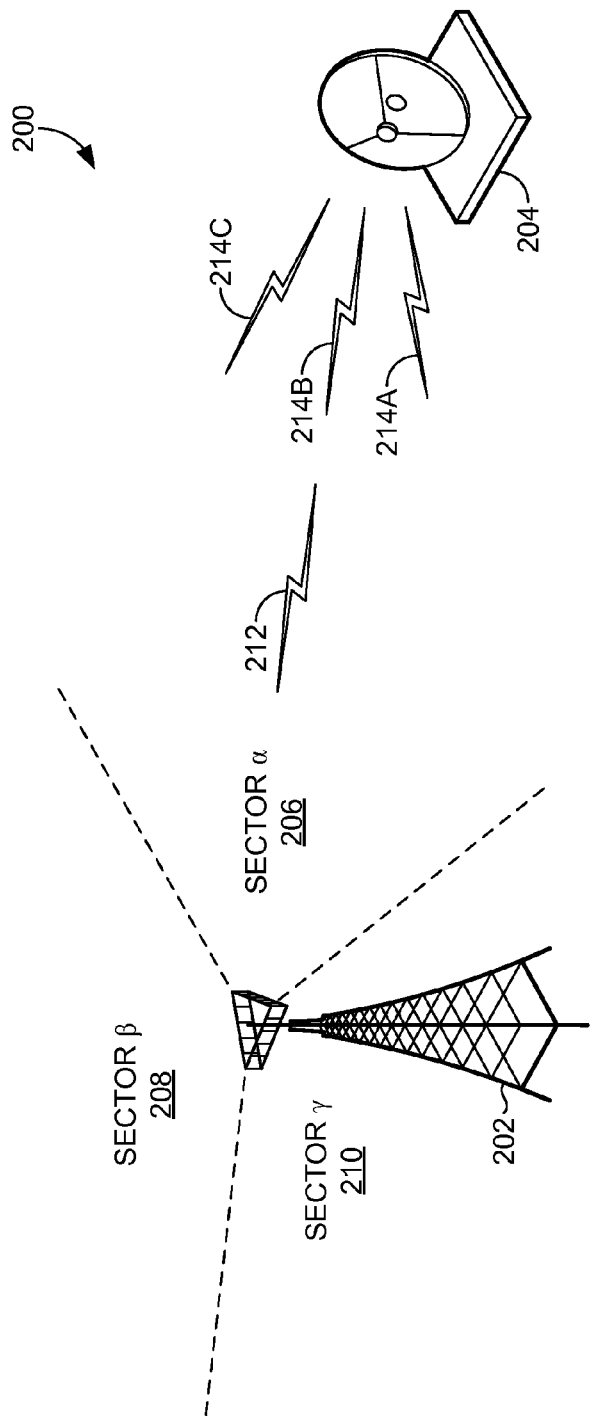
FIG. 2 depicts a diagram of an exemplary system architecture suitable for carrying out aspects herein.

Turning now to FIG. 2, a diagram of an exemplary system architecture suitable for carrying out aspects herein is depicted and designated generally as environment 200. Environment 200 is but one example of a suitable environment and is not intended to suggest any limitation as to the scope of use or functionality of the invention. Neither should the environment be interpreted as having any dependency or requirement relating to any one or combination of components illustrated.

The environment 200 includes a cell tower 202 and an electromagnetic radiation (EMR) source. Cell tower 202 is typically a tall structure designed to support one or more antennas for telecommunications and/or broadcasting. A radio tower is not intended herein to be limited to any shape and/or structure. For example, cell tower 202 may be a building or pole on which a transmitting antenna is installed. In other embodiments, a mobile cell tower may be employed.

Cell tower 202 sends and receives signals by way of, for example, communications link 212. For instance, for a mobile device in the wireless communications network, the mobile device may access the Internet by way of the cell tower 202 or other cell towers in the wireless communications network. Communications link 212 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a WiFi connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16. As such, in embodiments, the access component 206 may be one or more of a base transceiver station (BTS) tower, a WiFi Router, a Mobile Hotspot, and any other device that facilitates communication between a mobile device and a network. In one embodiment, the cell tower 202 includes both a WiFi Router and a BTS tower. In another embodiment, cell tower 202 is a BTS tower. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

In one embodiment, cell tower 202 is a tower that includes a base station, commonly termed a macrocell. A macrocell may comprise one or more sectors. In embodiments, cell tower 202 comprises three sectors, including sector a 206, sector β 208, and sector y 210. Each sector, as shown here, covers 120° of the total 360° covered by all three sectors combined. Typically, when there are three sectors, as shown in FIG. 2, there are three antennas, such that each antenna corresponds to a sector. Generally, an antenna is an electrical device that converts electric power into radio waves and converts radio waves into electric power. Antennas are typically positioned at or near the top of a cell tower, but can also be positioned differently.

EMR source 204, as referred to herein, is any type of source that is capable of emitting EMR. EMR is a form of radiant energy released by electromagnetic processes. EMR includes electromagnetic waves, which can be characterized by the frequency or wavelength of their oscillations to form the electromagnetic spectrum. The electromagnetic spectrum includes, in order of increasing frequency and decreasing wavelength, radio waves, microwaves, infrared radiation, visible light, ultraviolet radiation, X-rays, and gamma rays. The EMR source 204 may be rotating, in one embodiment, but in other embodiments, may not rotate, but instead may be cyclical, such as having a predictable pattern of when the EMR it is emitting is in the direction of a sector of the cell tower 202. One such EMR source is one that emits EMR at predictable intervals of time, even if the EMR source does not rotate. The commonality between the different EMR sources described herein is that the EMR source 204 emits EMR at predictable intervals of time, whether rotating or not.

EMR sources may operate within a frequency range that is defined by a governmental agency. Further, service providers, such as a wireless telecommunications carrier, also emit EMR from their respective cell towers, at frequencies defined by a governmental agency. However, even when both the antennas of a particular cell tower and a neighboring EMR source are emitting EMR within limits defined by the governmental agency, there is still a potential for interference of the EMR. For example, if cell tower 202, by way of its antennas, emits EMR in a range from 2400-2700 MHz, for example, and if neighboring EMR source 204 emits EMR in a range that is adjacent to the range of the cell tower 202, such as just above 2700 MHz, there could be a potential for interference. Aspects described herein work to minimize this potential by ceasing uplink and downlink transmissions to and from the cell tower 202 when the EMR source 204 is emitting EMR in a direction of a sector of cell tower 202.

A base station (not shown) associated with the cell tower 202 may have logic that allows it to make several different calculations, which provide an indication as to whether transmissions to and from any of that cell tower's 202 sectors have a potential for interference with emissions from the EMR source 204. For instance, a first indication of a potential for interference may come from any one of several network parameters being outside of their normal limits. For instance, a spike in signal values, including an increase in noise flow, a decrease in signal strength, a decrease in signal-to-noise ratio (SNR), and a decrease in reference signal received power (RSRP) may be used to determine, initially, that an EMR source 204 may present a potential for interference between the EMR emitted from the EMR source 204 and uplink and downlink transmissions from a particular sector of the cell tower 202.

In the embodiment of FIG. 2, sector a 206 has uplink and downlink transmission signals, represented by item 212, whereas the EMR source 204 has EMR emissions represented by items 214A, 214B, and 214C. Here, the base station (e.g., eNodeB) associated with the cell tower 202 may determine that one or more signal values, including noise flow, signal strength, SNR values, RSRP values, or the like, are outside of their normal limits. This may be considered a first potential of interference. Once this is determined, one or more computations may be made by, for example, the base station (e.g., eNodeB) to determine if there is a second potential for interference, and hence, if an action should be taken. Once a first potential of interference has been determined, the base station may compute the azimuth of sector a 206, sector β 208, and sector γ 210 to determine which sector's transmissions may pose a potential for interference with the EMR emitted by the EMR source 204. Once it has been determined which sector of cell tower 202 has an azimuth that is bearing toward the EMR source, which here, is sector a 206, a distance between sector a 206 and the EMR source 204 is computed. In one aspect, if both the sector's azimuth is bearing toward the EMR source 204 and the distance between the two is less than a predetermined threshold, an action may be taken.

Prior to an action being taken, the base station (e.g., eNodeB) may also compute a plurality of time intervals when the EMR source emits EMR in a direction of sector a 206. For instance, a first time interval may have a first time and a second time, wherein between the first and second times, the EMR source will be emitting EMR in the direction of sector a 206. In aspects, the first time may have an associated first position of the EMR source, and the second time may have an associated second position of the EMR source. As shown in FIG. 2, emitted EMR represented by item 214A may correspond to a first position of the EMR source 204, while emitted EMR represented by item 214C may correspond to a second position of the EMR source 204. Each time interval computed may have a first time and a second time, which can be used by the base station associated with cell tower 202 to cause an action to be taken. In aspects, the action is to cease uplink and downlink transmissions from sector a 206 from the first time until the second time. At the second time of each time interval, the base station may cause uplink and downlink transmissions to resume. As mentioned, the EMR source 204 may have a consistent rotating pattern, and as such, the base station can detect this and predict a plurality of time periods when the EMR source 204 will be emitting EMR in the direction of sector a 206. Alternatively, the EMR source 204 may not have a rotating pattern, or may not move at all, but instead may periodically emit EMR, which may be in the direction of sector a 206. In any case, the base station of the cell tower 202 is able to compute a plurality of time intervals based on the predictability of the EMR source 204 emitting EMR in a direction of sector a 206.

Figure 3:
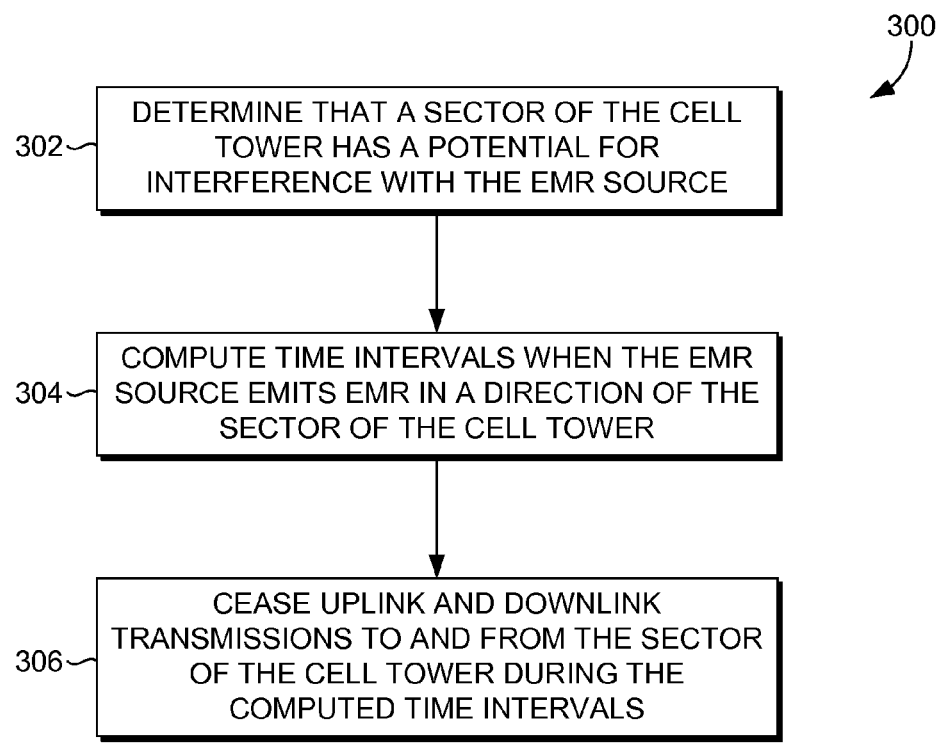
FIG. 3 depicts a flow diagram of an exemplary method for reducing an interference potential between a cell tower and an electromagnetic radiation source, in accordance with an aspect herein.

FIG. 3 depicts a flow diagram of an exemplary method 300 for reducing an interference potential between a cell tower and an electromagnetic radiation source, in accordance with an aspect herein. Initially, at block 302, it is determined, such as by a base station, that a sector of the cell tower has a potential for interference with the EMR source. As mentioned, this potential may include a first potential for interference based on monitoring of network parameters, and may also include a second potential for interference based on a computed azimuth of the sector and a distance between the sector and the EMR source. These network parameters may include signal values, noise flow, signal strength, SNR, RSRP, and the like. The monitoring of these network parameters may include determining when one or more exceed a predetermined threshold.

At block 304, time intervals are computed to determine when the EMR source emits EMR in a direction of the sector of the cell tower. Each time interval comprises a first time and a second time, where the first time is associated with a first position of the EMR source and where the second time is associated with a second position of the EMR source such that the EMR source is emitting EMR in the direction of the sector when it moves from the first position to the second position. The first and second positions of the EMR source may refer to, for instance, a direction at which the EMR source is pointing at a particular point in time. Once a first time interval is computed, subsequent time intervals may be computed based on a time it takes for the EMR source to move from the second position back to the first position. In reference to FIG. 2, this would be the time it takes for EMR source 204 to move from a position associated with emitting EMR 214C back around to a position associated with emitting EMR 214A. In one aspect, computing the time intervals of block 304 further comprises computing a first time interval based upon a first cyclical pattern of the EMR source, and based on this computation, computing at least a second time interval. As such, a first computation of a time interval may be used as a prediction of subsequent time intervals. In one embodiment, the computation of time intervals is performed prior to the base station being deployed. The computations may be done once at deployment, and again each time the base station or EMR source is taken offline for maintenance, for example. The computations may not need to be done repeatedly, as future time intervals can be predicted by the base station.

At block 306, uplink and downlink transmissions to and from the sector of the cell tower are ceased during each of the time intervals computed by, for instance, a base station, at block 304. As mentioned, in an LTE environment, the base station is termed an eNodeB, and may have the logic to make the computations described herein.

Figure 4:
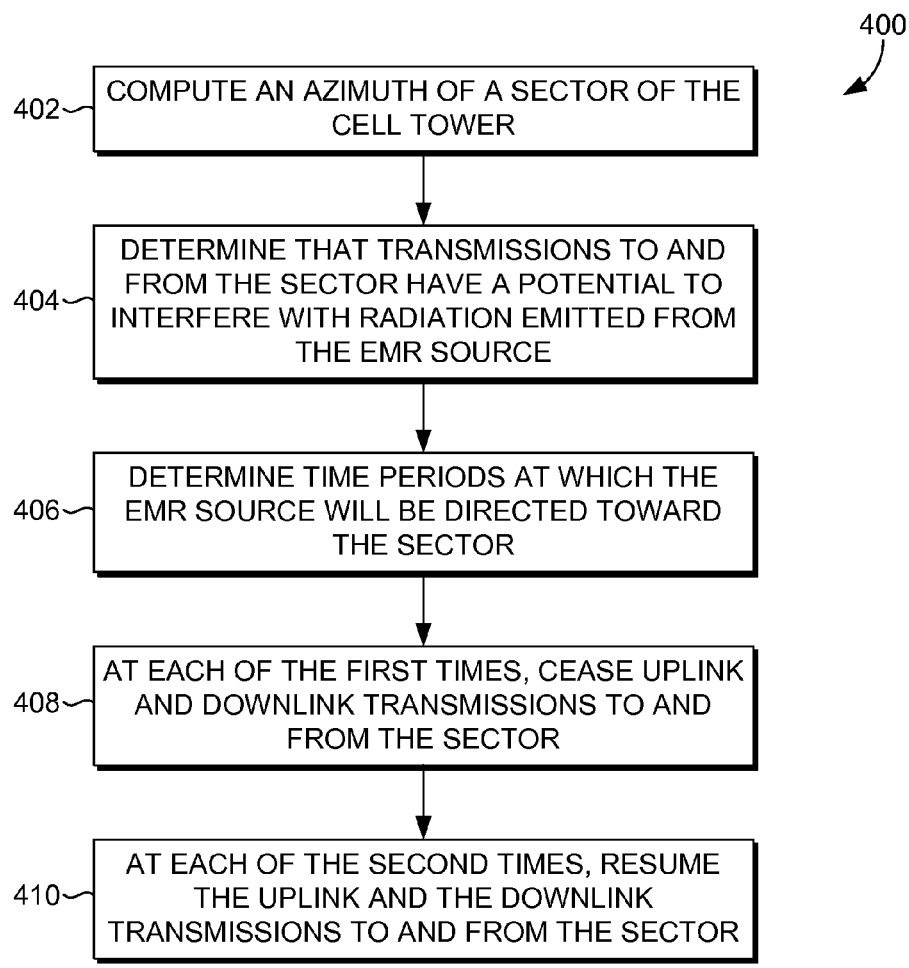
FIG. 4 depicts a flow diagram of another exemplary method for reducing an interference potential between a cell tower and an electromagnetic radiation source, in accordance with an aspect herein.

Turning now to FIG. 4, a flow diagram is depicted of another exemplary method 400 for reducing an interference potential between a cell tower and an electromagnetic radiation source, in accordance with an aspect herein. At block 402, an azimuth of a sector of the cell tower is computed. At block 404, it is determined that transmissions to and from the sector have a potential to interfere with EMR emitted from the EMR source, based at least on the computed azimuth of the sector. At block 406, time periods at which the EMR source will be directed toward the sector are determined, each of the time periods having a first time and a second time. The time periods may be determined based on a time it takes the EMR source to return to the first position from being at the second position. At each of the first times, uplink and downlink transmissions are ceased to and from the sector, shown at block 408. At each of the second times, uplink and downlink transmissions to and from the sector are resumed, shown at block 410. In aspects, each of the first times is associated with a first position of the EMR source, and each of the second times is associated with a second position of the EMR source.

Figure 5:
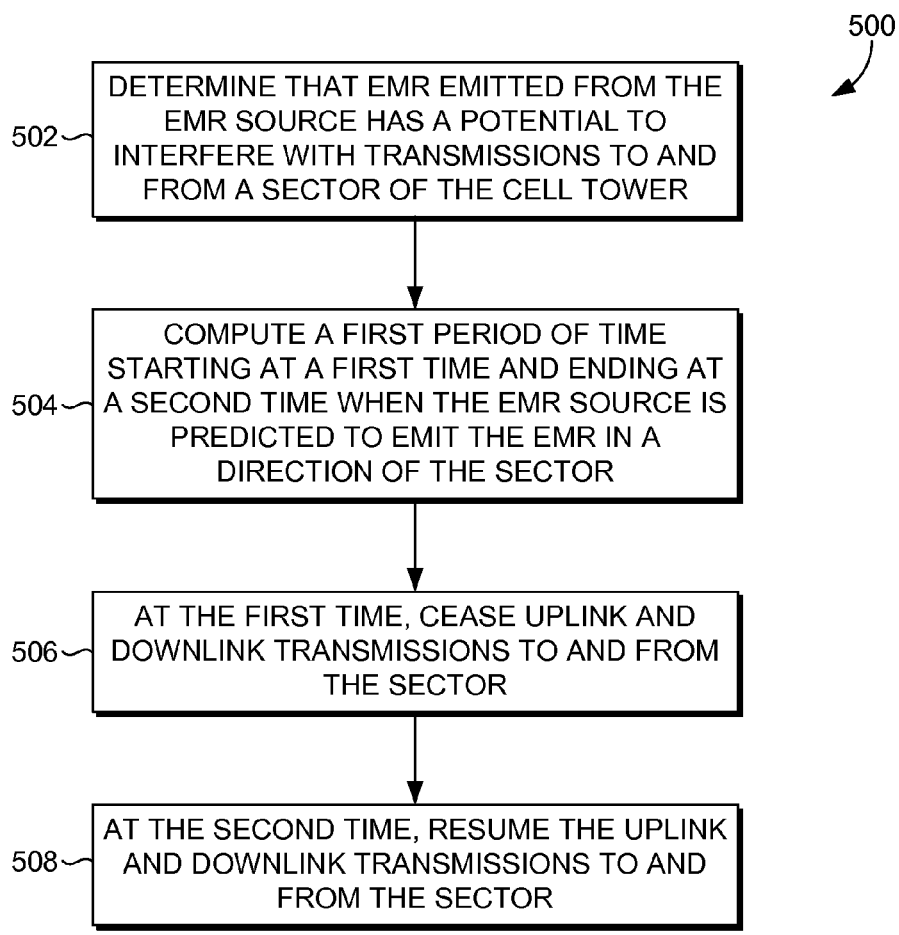
FIG. 5 depicts a flow diagram of yet another exemplary method for reducing an interference potential between a cell tower and an electromagnetic radiation source, in accordance with an aspect herein.

FIG. 5 depicts a flow diagram of yet another exemplary method 500 for reducing an interference potential between a cell tower and an electromagnetic radiation source, in accordance with an aspect herein. At block 502, it is determined that EMR emitted from the EMR source has a potential to interfere with transmissions to and from a sector of the base station. This determination may be based on, for example, a base station's monitoring of one or more network parameters, including noise flow, signal strength, SNR values, RSRP values, and the like. Then, the base station may determine which sector is likely to have interference, or at least have a potential of interference with an adjacent EMR source by computing an azimuth of each sector of the cell tower. For the sector whose azimuth is bearing toward the EMR source, a distance is measured between the sector and the EMR source. If the distance is less than a predetermined threshold, an action may be taken, as described below.

At block 504, a first period of time is computed, starting at a first time and ending at a second time when the EMR source is predicted to emit the EMR in a direction of the sector of the cell tower. At block 506, at the first time, uplink and downlink transmissions to and from the sector are ceased, and at block 508, at the second time, the uplink and downlink transmissions to and from the sector are resumed. In embodiments, the first time is associated with a first position of the EMR source, while the second time is associated with a second position of the EMR source. After a first period of time has been computed, a second period of time may then be computed, starting at a first time and ending at a second time corresponding to when the EMR source is predicted to emit EMR in a direction of the sector of the cell tower. The second period of time may be computed based on a length of time it takes the EMR source to return to the first position from the second position.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method carried out by at least one server having one or more processors for reducing an interference potential between a cell tower and an electromagnetic radiation (EMR) source, the method comprising:
   at a base station corresponding to the cell tower, determining that a sector of the cell tower has a potential for interference with the EMR source;
   computing a plurality of time intervals when the EMR source emits EMR in a direction of the sector of the cell tower, wherein each of the plurality of time intervals comprises a first time that is associated with a first physical orientation of the EMR source such that it is not emitting EMR in the direction of the sector, and a second time that is associated with a second physical orientation of the EMR source such that the EMR source is emitting the EMR in the direction of the sector when it moves from the first orientation to the second orientation; and
   in response to the EMR source emitting the EMR in the direction of the sector at the second time, ceasing uplink and downlink transmissions to and from the sector of the cell tower during the computed plurality of time intervals.

2. The method of claim 1, wherein the determining that the sector of the cell tower has the potential for interference with the EMR source further comprises:
   determining that there is a first potential for interference based on monitoring of one or more network parameters; and
   based on the determining that there is the first potential for interference, determining that there is a second potential for interference based on a computed azimuth of the sector and a distance between the sector and the EMR source.

3. The method of claim 2, wherein the one or more network parameters comprise signal values, noise flow, signal strength, signal-to-noise ratio, and reference signal received power.

4. The method of claim 2, wherein the determining that there is the first potential for interference further comprises determining that at least one of the monitored network parameters exceeds a predetermined threshold.

5. The method of claim 1, wherein computing the plurality of time intervals is based, at least, on a time period for the EMR source to move from the second position to the first position.

6. The method of claim 1, wherein the potential for interference is based on uplink and downlink transmissions of the sector of the cell tower and the EMR emitted from the EMR source.

7. The method of claim 1, wherein the computing of the plurality of time intervals when the EMR source radiates the EMR in the direction of the sector of the cell tower further comprises:
   computing a first time interval of the plurality of time intervals based upon a first cyclical pattern of the EMR source; and
   based on the computing of the first time interval, computing at least a second time interval of the plurality of time intervals.

8. The method of claim 7, wherein computing the at least the second time interval of the plurality of time intervals further comprises determining a time period that it takes the EMR source to rotate from the first position to the second position.

9. The method of claim 1, wherein the computing of the plurality of time intervals is performed prior to deployment of the cell tower.

10. A system for reducing an interference potential between a cell tower and an electromagnetic radiation (EMR) source, the system comprising:
   a processor; and
   one or more computer-readable media storing computer-useable instructions that, when used by the processor, cause the processor to:
   compute an azimuth of a sector of the cell tower,
   based on the azimuth of the sector and a distance between the sector and the EMR source, determine that transmissions to and from the sector have a potential to interfere with radiation emitted from the EMR source,
   determine a plurality of time periods at which the EMR source will be directed toward the sector, each of the plurality of time periods having a first time associated with the EMR source having the potential to interfere with transmissions to and from the sector and a second time associated with the EMR source not having the potential to interfere with transmissions to and from the sector,
   in response EMR source having the potential to interfere with transmissions to and from the sector at each of the first times, cease uplink and downlink transmissions to and from the sector, and
   in response EMR source not having the potential to interfere with transmissions to and from the sector at each of the second times, resume the uplink and the downlink transmissions to and from the sector.

11. The system of claim 10, wherein the plurality of time periods are determined based on a length of time it takes the EMR source to return to the first position from the second position.

12. One or more non-transitory computer-storage media having computer-executable instructions embodied thereon that, when executed, perform a method for reducing an interference potential between a cell tower and an electromagnetic radiation (EMR) source, the method comprising:

determining that EMR emitted from the EMR source has a potential to interfere with transmissions to and from a sector of the cell tower, the potential interference determined based on an azimuth of the sector and a distance between the sector and the EMR source;

computing a first period of time starting at a first time that is associated with a determination that the EMR source is predicted to emit a signal that potentially interferes with transmissions to and from the sector of a cell tower and ending at a second time that is associated with a determination that the EMR source is predicted to not emit the EMR that potentially interferes with transmissions to and from the sector of the cell tower;

in response to the determination that the EMR source is predicted to emit the signal that potentially interferes with transmission to and from the sector of a cell tower at the first time, ceasing uplink and downlink transmissions to and from the sector of the cell tower; and in response to the determination that the EMR source is not predicted to emit the signal that potentially interferes with transmission to and from the sector of a cell tower at the second time, resuming the uplink and downlink transmissions to and from the sector of the cell tower.

13. The one or more non-transitory computer-storage media of claim 12, wherein the first time is associated with a first position of the EMR source and wherein the second time is associated with a second position of the EMR source.

14. The one or more non-transitory computer-storage media of claim 13, further comprising computing a second period of time starting at a first time and ending at a second time when the EMR source is predicted to emit the EMR in a direction of the sector of the cell tower.

15. The one or more non-transitory computer-storage media of claim 14, wherein the second period of time is computed based on a length of time it takes the EMR source to return to the first position from the second position.

16. The one or more non-transitory computer-storage media of claim 14, wherein the determining that the EMR emitted from the EMR source has the potential to interfere with the transmissions to and from the sector of the cell tower further comprises:

determining that there is a first potential for interference based on monitoring of one or more network parameters; and based on the determining that there is the first potential for interference, determining that there is a second potential for interference based on a computed azimuth of the sector and a distance between the sector and the EMR source.

17. The one or more non-transitory computer-storage media of claim 16, wherein the one or more network parameters comprise signal values, noise flow, signal strength, signal-to-noise ratio, and reference signal received power.

* * * * *